April 21, 1953 A. R. ROBERGE 2,635,790
DEVICE FOR OBSERVING THE AMOUNT
OF POURED GRAINS OF MATERIAL
Filed July 5, 1950

INVENTOR,
ARTHUR ROBERT ROBERGE
BY
ATTORNEYS

Patented Apr. 21, 1953

2,635,790

UNITED STATES PATENT OFFICE 2,635,790

DEVICE FOR OBSERVING THE AMOUNT OF POURED GRAINS OF MATERIAL

Arthur Robert Roberge, La Crosse, Wis.

Application July 5, 1950, Serial No. 172,136

1 Claim. (Cl. 222—424.5)

This invention relates to a device which enables a user of condiments, such as salt, pepper or other particles or grains to observe the number or particles or grains which have been poured out of a dispenser for example, a salt or pepper shaker, before the same have been deposited on food.

A principal object of the invention therefore, is to provide a device for observing and measuring the number of grains which have been poured out of a dispenser, before the grains are allowed to be deposited on food, or other material to thereby avoid pouring too large quantity on such food or other material.

An additional object is to provide a ready means by which the quantity of salt granules, or other granules may be observed, even in dimly lit rooms, before depositing the said granules on food.

Other objects of the invention will appear hereinafter throughout the specification.

While the device of the present invention is particularly adapted for use with a condiment dispenser it may be used for other purposes such as dispensing grains of medicines. Dimly lit rooms or light colored dishes make it very difficult to determine the amount of salt or other material that have been sprinkled from a salt shaker. Other conditions, such as background materials, be they food or surfaces also are contributing factors in determining the visible amount of material that has been sprinkled on them. The present invention overcomes these difficulties, as the amount of grains of material to be dispensed may be clearly seen before they are allowed to be deposited on the material, or on a support.

Figure 1:
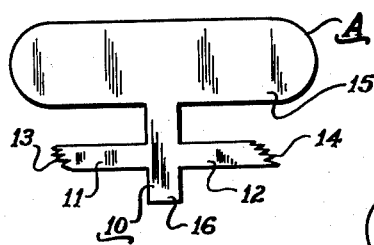
Figure 1 is a stamping showing one form of the invention before application to a salt or other container for condiments.
Figure 2:
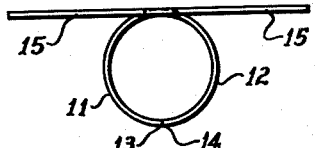
Figure 2 is a top plan view of the structure illustrated in Figure 1 but with the attaching band in position for engagement with the cap of a container.

Referring to Figures 1 and 2 the letter A indicates the stamping as a whole. This may consist, as in the form shown, of a single piece of material that is made of metal, plastic, glass material, rubber or other material.

In Figures 1 and 2 the numeral 10 shows the tab, and extending on opposite sides thereof are arms 11 and 12, the ends of which are broken off at 13 and 14. The upper end of the tab has a pan 15 which is of sufficient depth and width to support a plurality of grains of material.

The invention will hereinafter be described and claimed as a device for use with, or as a part of a salt cellar, it being understood that a salt cellar is one of the many dispensing containers with which the device of the present invention may be used.

Assuming the use of this device with or as a part of a salt cellar, the device will have a color, particularly the pan 15, which contrasts with white such as red, green, brown, blue or other contrasting color, inasmuch as salt grains are usually white in color. The upper surface or the pan 15 is preferably flat but may be concave (not shown) so as to be the general shape of a spoon. The lower extension 16 of the tab 10 is adapted to extend along the neck of the salt cellar, and it may be bent so as to be slightly concave (not shown), to thereby more closely engage the neck of the salt cellar.

Preferably the stamping A and particularly the arms 11 and 12 are of tensional material so that when the arms 11 and 12 are bent in the position shown in Figure 2, they will be biased toward each other and will therefore tightly clasp the neck portion of the salt cellar thus rigidly holding the pan in proper position beneath and to one side of the several cap openings in the salt cellar (not shown).

Where possible, that is, where the device is constructed to be applied to a large number of salt cellars of the same size and dimensions, the arms 11 and 12 are made of such length that the ends will approach each other, or they may overlap each other.

Figure 3:
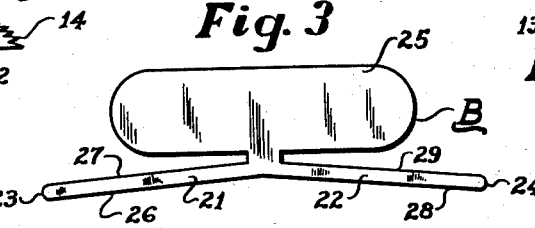
Figure 3 is a stamping of another form of the invention.
Figure 4:
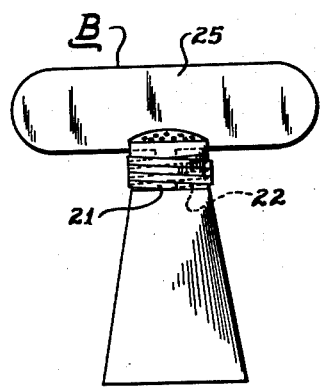
Figure 4 is a side elevation of the stamping shown in Figure 3 as applied to a container.
Figure 5:
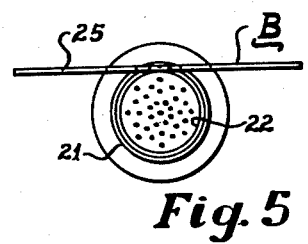
Figure 5 is a top plan view of the structure of Figure 4.

Referring to Figures 3, 4 and 5, B indicates the device as a whole.

The arms 21 and 22 are integral with the plate or pan 25 which latter is similarly shaped to the plate or pan 15 of Figures 1 and 2.

These arms form part of the same stamping as pan 25 and they have rounded ends 23 and 24.

Arm 21 has a lower side 26 and an upper side 27, and arm 22 has a lower side 28 and an upper side 29.

These arms are wrapped around the neck or cap of a salt cellar in spirals. They are biased to a closed position to thereby tightly grip the neck or cap of the salt cellar.

Figure 6:
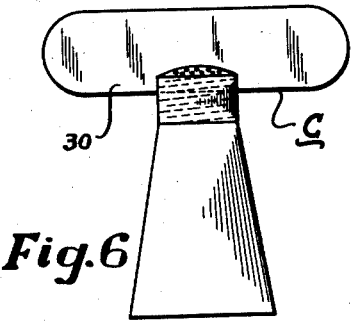
Figure 6 is a front elevation of a third form of the invention wherein the spreader is integral with the container cap.
Figure 7:
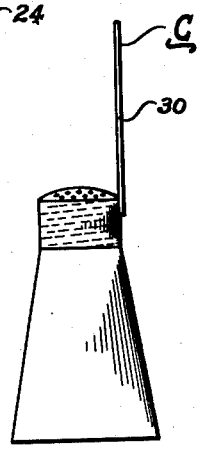
Figure 7 is a side elevation of structure illustrated in Figure 6.

In Figures 6 and 7 the device consists of a plate or pan 30 that may be an integral part of the cap or which has been welded or otherwise fixed to the cap of a salt cellar.

Figure 8:
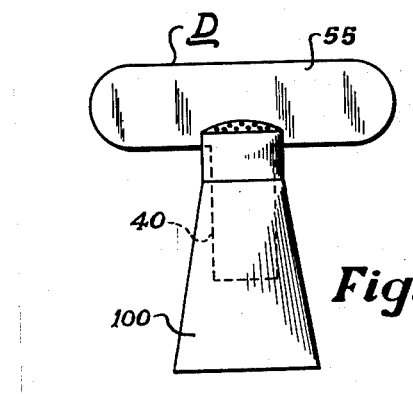
Figure 8 is a front view of still another form of the invention wherein the plate is permanently fixed to the container.
Figure 9:
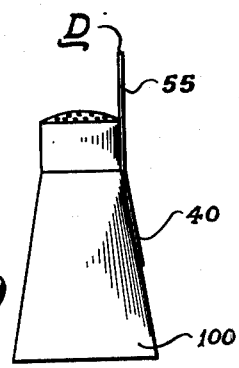
Figure 9 is a side view of the structure shown in Figure 8.

In Figures 8 and 9 a salt cellar of metal, glass or plastic material is provided. The device of this invention in these figures is indicated by the letter D. Rigidly and permanently fixed to the side of the salt cellar 100 by welding or otherwise, is a tab 40 which extends longitudinally of the salt cellar 100. Pan or plate 55 may be an integral part of the salt cellar with the tab 40 omitted.

This tab forms part of the pan or plate 55, which latter is constructed similarly to the pan or plate 15, 25, or 30, and while preferably providing a plane supporting surface, may provide a concave supporting surface instead.

It will be appreciated that the pan or plate illustrated in each of the figures, is of a color which contrasts with the salt or other material in the container, so that the number of grains from the container may be positively determined.

I desire to be limited in the practice of my invention only to the extent indicated by the appended claim.

I claim:

A measuring and dispensing device for granular material including a condiment holder having an apertured dispensing cap, and a measuring pan having planar surfaces secured to said cap tangentially thereof, comprising oppositely and laterally disposed portions, and said pan extending in a plane parallel to the axis of said cap and substantially in advance of the apertures therein.

A. ROBERT ROBERGE.

References Cited in the file of this patent

UNITED STATES PATENTS

| Number | Name | Date |
|---|---|---|
| 261,330 | Freeman | July 18, 1882 |
| 657,363 | Sanderson | Sept. 4, 1900 |
| 705,018 | Bechtold | July 22, 1902 |
| 783,688 | Dujat | Feb. 28, 1905 |
| 967,764 | Hannah | Aug. 16, 1910 |
| 1,165,285 | Record | Dec. 21, 1915 |
| 1,191,464 | Record | July 18, 1916 |
| 1,617,273 | Piquet | Feb. 8, 1927 |
| 1,950,505 | Matters | Mar. 13, 1934 |
| 1,959,295 | Van Deerlin et al. | May 15, 1934 |